United States Patent
Kim et al.

(10) Patent No.: US 9,640,796 B2
(45) Date of Patent: May 2, 2017

(54) PREPARATION METHOD OF TRANSITION METAL OXIDE AND CARBON NANOTUBE COMPOSITE, AND COMPOSITE THEREOF

(75) Inventors: Kwang Bum Kim, Gyeonggi-do (KR); Hyun Kyung Kim, Chungcheongbuk-do (KR); Ji Young Kim, Seoul (KR)

(73) Assignee: INDUSTRY ACADEMIC COOPERATION FOUNDATION, Yonsei (KR)

( * ) Notice: Subject to any disclaimer, the term of this patent is extended or adjusted under 35 U.S.C. 154(b) by 727 days.

(21) Appl. No.: 13/635,872

(22) PCT Filed: Apr. 20, 2011

(86) PCT No.: PCT/KR2011/002830
§ 371 (c)(1),
(2), (4) Date: Oct. 24, 2012

(87) PCT Pub. No.: WO2011/132932
PCT Pub. Date: Oct. 27, 2011

(65) Prior Publication Data
US 2013/0037758 A1    Feb. 14, 2013

(30) Foreign Application Priority Data
Apr. 20, 2010  (KR) .................. 10-2010-0036146

(51) Int. Cl.
C01B 31/02    (2006.01)
H01B 1/04    (2006.01)
(Continued)

(52) U.S. Cl.
CPC ............. *H01M 4/485* (2013.01); *B82Y 30/00* (2013.01); *B82Y 40/00* (2013.01);
(Continued)

(58) Field of Classification Search
CPC .......... H01M 4/04; B82Y 30/00; B82Y 40/00; C01B 31/02; H01B 1/02
(Continued)

(56) References Cited

U.S. PATENT DOCUMENTS

2007/0074601 A1 *  4/2007  Hong et al. .................... 75/345
2009/0136415 A1 *  5/2009  Gorshkov et al. ............ 423/598
(Continued)

FOREIGN PATENT DOCUMENTS

CN    1971780 A  *  5/2007  ............. B01J 19/00
CN    101663781 A    3/2010
(Continued)

OTHER PUBLICATIONS

Yu et al. (Enhancement of photocatalytic activity of mesoporous TiO2 by using carbon nanotubes. Appl Cat A, 289, pp. 186-196, Jun. 2005).*
(Continued)

Primary Examiner — Tri V Nguyen
(74) Attorney, Agent, or Firm — Swanson & Bratschun, L.L.C.

(57) ABSTRACT

Provided is a method of preparing a complex of a transition metal oxide and carbon nanotube. The method includes (a) dispersing carbon nanotube powder in a solvent, (b) mixing the dispersion with a transition metal salt, and (c) synthesizing a complex of transition metal oxide and carbon nanotube by applying microwave to the mixed solution. The method may considerably reduce the time required to synthesize the complex. In the complex of transition metal oxide and carbon nanotube prepared by the method, the transition metal oxide may be stacked on the surface of the carbon nanotube in the size of a nanoparticle, and may enhance charge/discharge characteristics when being applied to a lithium secondary battery as an anode material.

5 Claims, 12 Drawing Sheets

(51) Int. Cl.
*H01M 4/485* (2010.01)
*B82Y 30/00* (2011.01)
*B82Y 40/00* (2011.01)
*H01M 4/36* (2006.01)
*H01M 4/62* (2006.01)
*H01M 4/525* (2010.01)
*H01M 4/587* (2010.01)
*H01M 10/052* (2010.01)

(52) U.S. Cl.
CPC ......... *C01B 31/0273* (2013.01); *H01M 4/366* (2013.01); *H01M 4/525* (2013.01); *H01M 4/625* (2013.01); *H01M 4/587* (2013.01); *H01M 10/052* (2013.01); *Y02P 70/54* (2015.11)

(58) Field of Classification Search
USPC .......... 252/500–519.1, 507; 423/445 R, 460; 977/842, 900, 901
See application file for complete search history.

(56) References Cited

U.S. PATENT DOCUMENTS

| | | |
|---|---|---|
| 2009/0225498 A1 | 9/2009 | Lee et al. |
| 2009/0304923 A1 | 12/2009 | Mitra et al. |
| 2011/0262809 A1* | 10/2011 | Kumagai et al. ............. 429/211 |

FOREIGN PATENT DOCUMENTS

| | | | |
|---|---|---|---|
| JP | 2001-213622 | 8/2001 | |
| KR | 20-0421511 | 7/2006 | |
| KR | 10-0740860 | 7/2007 | |
| KR | 10-0886082 | 2/2009 | |
| KR | 20-2009-0011222 | 11/2009 | |
| KR | 10-2009-0124199 A | 12/2009 | |
| KR | 20090124199 | * 12/2009 | ............... B82B 3/00 |
| KR | 10-1100745 | 12/2011 | |
| WO | WO 2009/061013 A1 | 5/2009 | |
| WO | WO 2010/027336 A1 | 3/2010 | |

OTHER PUBLICATIONS

Corradi et al. (Conventional and Microwave-Hydrothermal Synthesis of TiO2 Nanopowders. J Am Ceram Soc, 88(9), pp. 2639-2641, 2005).*
Chen et al. (Titanium Dioxide Nanomaterials: Synthesis, Properties, Modifications, and Applications. Chem Rev, 107, pp. 2891-2959, 2007).*
Ma et al. (Synthesis and characterization of manganese dioxide spontaneously coated on carbon nanotubes. Carbon, 45, pp. 375-382, online Oct 2006).*
Kim et al. (Microwave-polyol synthesis of nanocrystalline ruthenium oxide nanoparticles on carbon nanotubes for electrochemical capacitors. Elect Acta, 55, pp. 8056-8061, Online Apr. 18, 2010).*
Ma et al. (Nano-sized lithium manganese oxide dispersed on carbon nanotubes for energy storage applications. Elect Comm, 11, pp. 1575-1578, online Jun. 23, 2009).*
Huang ("The preparation and characterization of Li4Ti5O12/carbon nano-tubes for lithium ion battery." Electroch Acta, 53, pp. 7756-7759, online May 21, 2008).*
Li et al. "Microwave solid-state synthesis of spinel Li4Ti5O12 nanocrystallites as anode material for lithium-ion batteries" ScienceDirect Solid State Ionics 178(2007) 1590-1594.
EP Search Report for application 11772220.7 dated Mar. 10, 2015.
Jin, Yongli "Studies on the Nano-Structured Anode Materials of Lithium Ion Battery", Xinjiang University, Master's Thesis, w/English translation.
First CN Office Action for 201180015799.6, dated Sep. 3, 2014.
International Search Report mailed Nov. 2, 2010 for International Application No. PCT/KR2010/000673.
Jin, Yongli "Studies on the Nano-Structured Anode Materials of Lithium Ion Battery", Xinjiang University, Master's Thesis, w/English translation, Jun. 2007.

* cited by examiner

PREPARATION METHOD OF TRANSITION METAL OXIDE AND CARBON NANOTUBE COMPOSITE, AND COMPOSITE THEREOF

CROSS-REFERENCE TO RELATED APPLICATION

This application is a 35 U.S.C. §371 national phase application of PCT/KR2011/002830 (WO 2011/132932), filed on Apr. 20, 2011, entitled "PREPARATION METHOD OF TRANSITION METAL OXIDE AND CARBON NANOTUBE COMPOSITE, AND COMPOSITE THEREOF", which application claims priority to and the benefit of Korean Patent Application No. 2010-0036146, filed Apr. 20, 2010, the disclosure of which is incorporated herein by reference in its entirety.

BACKGROUND

1. Field of the Invention

The present invention relates to a method of preparing a complex of transition metal oxide and carbon nanotube (CNT) and a complex prepared thereby, and more particularly, to a complex of transition metal oxide and CNT, which can be used as an electrode material for a lithium secondary battery, and a method of preparing the same.

2. Discussion of Related Art

In recent years, according to the development of portable electronic devices, such as mobile phones, laptop computers and camcorders, the demand for compact secondary batteries, such as nickel-hydrogen secondary battery and lithium secondary battery, is increasing. Particularly, the lithium secondary battery using lithium and non-aqueous solvent electrolyte has a high chance to be implemented as a compact, light-weight and high energy density battery, and thus research on this technology is actively progressing.

Generally, the lithium secondary battery is configured using a transition metal oxide such as $LiCoO_2$, $LiNiO_2$ or $LiMn_2O_4$ as a cathode material, lithium metal or carbon as an anode material, and an organic solvent containing a lithium ion as an electrolyte between the two electrodes. However, a lithium secondary battery using lithium metal as an anode easily produces crystals on a resin when charging and discharging are repeated and therefore is at high risk for short circuit. Accordingly, a lithium secondary battery using a carbonated or graphitized carbon material as an anode material, and a non-aqueous solvent containing a lithium ion as an electrolyte is practically used.

However, since a carbon-based anode material has high irreversible capacity, initial charge/discharge efficiency and capacity are reduced. Accordingly, in recent years, research on a transition metal oxide as an anode material for a lithium secondary battery has been actively conducted. However, when an electrode is manufactured with a transition metal oxide, carbon particle, such as carbon black used as a conductive material, is difficult to uniformly mix due to the size of the particle itself and is necessarily added in a large amount to enhance electric conductivity. Therefore, the ratio of an electrode active material based on total weight of the electrode material is reduced, and the amount of conductive material not participating in the electrochemical reaction is increased, which serve to decrease capacitance.

In a complex of transition metal oxide and CNT, since the CNT has a quasi-one-dimensional quantum structure, various specific quantum phenomena in low dimension are observed, the CNT has excellent dynamic firmness, chemical stability and thermal conductivity, and the unique characteristics in which the CNT has characteristics of a conductor or semiconductor depends on its structure. When the transition metal oxide is attached to the CNT, excellent material characteristics of the CNT may be improved, and the transition metal oxide may serve as a conductive path. Here, nanotization and distribution control of the transition metal oxides on the CNT are essential to increase the specific surface area of the oxide.

However, a conventional method of preparing a complex of transition metal oxide and CNT essentially includes a step of treating the surface of the CNT with an acid before coating the transition metal oxide. This is because CNT powder is difficult to disperse in a solvent, since the particle surface of the CNT powder that does not undergoing acid treatment is hydrophobic. However, the acid treatment serves as a cause of temporal/economical limitations in terms of practical application and further induces damage to the structure of the CNT at a growing state.

Meanwhile, in recent years, as an anode material for a lithium ion battery, $Li_4Ti_5O_{12}$ having a spinel structure has attracted attention, since the material is less altered in volume during charge/discharge and thus has various advantages, such as having a stable lifespan (life cycle) for a long time, preventing the decrease in electrolyte on the surface of the electrode, etc. However, the conventional $Li_4Ti_5O_{12}$ having a spinel structure is difficult to nanotize due to limitation in preparation and has poor capacity and rate capability when used as an anode material for a lithium battery. In addition, since it takes a long time (e.g., 24 hours) to synthesize the material, the material has many problems to predetermine to be practically applied to a lithium secondary battery. Therefore, means to solve these problems are required.

SUMMARY OF THE INVENTION

The present invention is directed to providing a method of preparing a complex of transition metal oxide and CNT, in which the transition metal oxide used as a material for an electrode of a lithium secondary battery may be uniformly formed on the surface of the CNT in the size of a nanoparticle, and a complex prepared thereby.

The present invention is further directed to providing a method of preparing a complex of transition metal oxide and CNT, in which the transition metal oxide may be uniformly formed on the surface of the CNT complex in the size of a nanoparticle without acid treatment of the surface of the CNT, and a complex prepared thereby.

The present invention is further directed to providing a method of preparing a complex of transition metal oxide and CNT, in which the transition metal oxide may be uniformly formed on the surface of the CNT complex in the size of a nanoparticle for a short time, and a complex prepared thereby.

The present invention is further directed to providing an anode material for a lithium secondary battery providing high capacity and rate capability since it is included in the form of the complex, and a lithium secondary battery including an electrode having the anode material.

In one aspect, the method of preparing a complex of transition metal oxide and CNT may include (a) a step in preparing a dispersion by dispersing CNT powder in a solvent, (b) a step in preparing a mixed solution of the dispersion with a transition metal salt, and (c) a step in synthesizing the complex of transition metal oxide and CNT by applying microwave to the mixed solution.

In another aspect, a complex of lithium titanium oxide ($Li_4Ti_5O_{12}$) having a spinel structure and CNT may include CNT and lithium titanium oxide ($Li_4Ti_5O_{12}$) having a spinel structure stacked on the surface of the CNT.

In still another aspect, an anode material for a lithium secondary battery may include the complex of lithium titanium oxide ($Li_4Ti_5O_{12}$) having a spinel structure and CNT according to the present invention.

In yet another aspect, a lithium secondary battery may include an electrode having the anode material for a lithium secondary battery according to the present invention.

BRIEF DESCRIPTION OF THE DRAWINGS

The above and other objects, features and advantages of the present invention will become more apparent to those of ordinary skill in the art by describing in detail exemplary embodiments thereof with reference to the adhered drawings, in which.

DETAILED DESCRIPTION OF EXEMPLARY EMBODIMENTS

Hereinafter, the present invention will be described in detail with reference to examples according to the present invention and Comparative Examples, but the scope of the present invention is not limited to the following examples.

The present invention relates to a method of preparing a complex of transition metal oxide and CNT, including (a) a step in preparing a dispersion by dispersing CNT powder in a solvent, (b) a step in preparing a mixed solution of the dispersion with a transition metal salt, and (c) a step in synthesizing the complex of transition metal oxide and CNT by applying microwave to the mixed solution.

Hereinafter, the method of preparing a complex of transition metal oxide and CNT according to the present invention will be described in detail.

The method of preparing a complex of transition metal oxide and CNT according to the present invention may include operation (a). In operation (a), CNT powder is dispersed in a solvent.

In operation (a) of the present invention, the CNT powder includes single-wall CNT powder and multi-wall CNT powder, but the type of CNT powder is not particularly limited.

In operation (a) of the present invention, a method of dispersing the CNT powder in a solvent is not particularly limited, and thus the CNT powder may be disposed in a solvent by treating ultrasonic waves or simply stirring. Preferably, the CNT powder is uniformly dispersed in a solvent by treating it with ultrasonic waves.

In operation (a) of the present invention, the kind of solvent in which the CNT powder is dispersed is not particularly limited. The solvent may be at least one selected from the group consisting of distilled water, ethanol and ethyleneglycol, but preferably distilled water.

The method of preparing a complex of transition metal oxide and CNT according to the present invention may include operation (b). In operation (b), the dispersion prepared in operation (a) is mixed with a transition metal salt.

In operation (b) of the present invention, the kind of transition metal salt is not particularly limited, and the transition metal salt is preferably titanium salt, iron salt, ruthenium salt or lithium salt.

In the present invention, the amount of stacking transition metal oxide on the surface of the CNT may be adjusted by controlling the concentration of the transition metal salt mixed with the dispersion in operation (b).

In operation (b) of the present invention, to adjust the pH of the mixed solution of the dispersion and the transition metal salt, a pH adjuster may be further mixed. The kind of pH adjuster used is not particularly limited, and thus the pH adjuster may be at least one selected from the group consisting of distilled water, ammonia, urea, sodium hydroxide and potassium hydroxide.

In operation (b) of the present invention, stirring may be performed to uniformly dissolve the transition metal salt in the prepared mixed solution.

The method of preparing a complex of transition metal oxide and CNT according to the present invention may include operation (c). In operation (c), a complex of transition metal oxide and CNT may be synthesized by applying microwave to the mixed solution prepared through operation (b).

In operation (c) of the present invention, when the microwave is applied to the mixed solution, all of the mixed solution may be uniformly and rapidly heated. In the present invention, as described above, the time to synthesize the complex may be considerably reduced by using microwave as the means for heating the mixed solution.

In operation (c) of the present invention, as the microwave is applied to the mixed solution, free electrons present in the CNT may accelerate absorption of the microwave. As the free electrons in the CNT are accelerated, a carbon lattice in the CNT may also rapidly vibrate, and thus the CNT may be relatively heated to a higher temperature than the peripheral materials of the CNT in the mixed solution. As a result, in an atmosphere of heating the mixed solution according to the application of microwave, nuclear generation of the transition metal oxide on the surface of CNT may be stimulated, and selected non-uniform nuclear generation growth may be induced. Therefore, the transition metal salt in the mixed solution may be uniformly and rapidly formed in the size of a nanoparticle on the surface of the CNT in the form of transition metal oxide according to the above-described process.

In addition, in operation (c), when the microwave is applied to the mixed solution, it is preferable that the microwave only serves to heat the mixed solution, not to break bonds in the molecular structure of the solvent. Accordingly, in operation (c), the microwave may have a frequency to such an extent that energy thereof does not break the molecular structure of the solvent in the mixed solution. The frequency of the microwave may be 2.45 to 60 GHz. For example, in the preparation method of the present invention, when distilled water is used as a dispersion solvent, chemical bonding energy of a water molecule may be approximately 0.21 eV, and quantum energy of the microwave at 2.45 GHz may be approximately 0.0016 eV. Therefore, energy applied by the 2.45 GHz microwave may just heat the mixed solution, but may have no influence on molecular bonding in the distilled water used as the dispersion solvent.

In addition, in operation (c) of the present invention, the microwave may be applied to the mixed solution for 10 to 30 minutes. When the microwave is applied for less than 10 minutes, the mixed solution may be barely heated, and thus nanoparticles of the transition metal oxide may not be sufficiently formed on the surface of the CNT. When the microwave is applied for more than 30 minutes, the size of the nanoparticle of the transition metal oxide formed on the surface of the CNT is increased to 30 nm or more, and thus the particles may be non-uniform.

In operation (c) of the present invention, hydrothermal synthesis, i.e., the process of changing the transition metal salt present in the mixed solution into a transition metal oxide, may be performed at boiling point or at a higher temperature of the mixed solution.

In operation (c) of the present invention, the size of the particle of the transition metal oxide formed on the surface of the CNT may be 2 to 30 nm.

The method of preparing a complex of transition metal oxide and CNT according to the present invention may further include operation (d). In operation (d), the complex of transition metal oxide and CNT synthesized through operation (c) is cleaned and dried.

In operation (d) of the present invention, the complex may be cleaned with at least one cleaning solution selected from the group consisting of ethanol, methanol, propanol, acetone and deionized water. The cleaning of the complex may be repeated until all of the solvent and impurities remaining in the prepared complex of transition metal oxide and CNT are removed.

In operation (d) of the present invention, after cleaning the complex, the complex may be dried, and here, the drying method is not particularly limited. Any method generally used in the art may be employed without limitation, and for example, the drying may be performed at room temperature to 70° C.

The kind of the complex of transition metal oxide and CNT prepared by the preparation method of the present invention may include, but is not particularly limited to, at least one selected from the group consisting of a complex of titanium oxide ($TiO_2$) and CNT, a complex of iron oxide ($Fe_3O_4$) and CNT, a complex of ruthenium oxide ($RuO_2$) and CNT, and a complex of lithium titanium oxide and CNT.

A method of preparing the complex of lithium titanium oxide and CNT according to the present invention may include: a step in preparing a dispersion by dispersing powder of the complex of titanium oxide and CNT prepared according to the preparation method of the present invention in a solvent; a step in preparing the mixed solution by mixing the dispersion solution with a lithium salt; and a step in synthesizing the complex of lithium titanium oxide and CNT by applying microwave in the mixed solution.

In the operation of dispersing the complex of lithium titanium oxide and CNT in a solvent, the method of dispersing the complex of titanium oxide and CNT in a solvent and the kind of the dispersion solvent are the same as described above.

The operation of mixing the dispersion with a lithium salt may also be performed by the same method as described above.

The operation of synthesizing the complex of lithium titanium oxide and CNT by applying microwave in the mixed solution may also be performed by the same method as described above. That is, as the microwave having a frequency of 2.45 to 60 GHz is applied to the mixed solution for 10 to 30 minutes, the complex of lithium titanium oxide and CNT may be synthesized.

In the complex of lithium titanium oxide and CNT of the present invention, the particle size of the lithium titanium oxide may be 5 to 30 nm.

In the present invention, the method of preparing the complex of lithium titanium oxide and CNT may further include an heat-treating operation to the complex of lithium titanium oxide and CNT in an argon atmosphere including hydrogen to prepare a complex of lithium titanium oxide ($Li_4Ti_5O_{12}$) having a spinel structure and CNT.

In the present invention, heat treatment may be performed in a temperature range in which the nano structure of the lithium titanium oxide may not be destroyed, and the lithium titanium oxide may be changed into lithium titanium oxide ($Li_4Ti_5O_{12}$) having a spinel structure. The heat treatment may be performed at a temperature of 500 to 900° C. When the temperature for the heat treatment is less than 500° C., the structural change into the lithium titanium oxide ($Li_4Ti_5O_{12}$) having a spinel structure may not occur, and when the temperature for the heat treatment is more than 900° C., the lithium titanium oxide is possibly changed into lithium titanium oxide (e.g., $Li_2Ti_3O_7$) having a different structure, not the lithium titanium oxide ($Li_4Ti_5O_{12}$) having a spinel structure, and the particles may be condensed due to the increased particle size.

The present invention also relates to a complex of lithium titanium oxide ($Li_4Ti_5O_{12}$) having a spinel structure and CNT, including the CNT and lithium titanium oxide ($Li_4Ti_5O_{12}$) having a spinel structure stacked on the surface of the CNT.

In the complex of lithium titanium oxide ($Li_4Ti_5O_{12}$) having a spinel structure and CNT according to the present invention, the particle size of the lithium titanium oxide ($Li_4Ti_5O_{12}$) having a spinel structure may be 5 to 30 nm. In the complex of lithium titanium oxide ($Li_4Ti_5O_{12}$) having a spinel structure and CNT, the lithium titanium oxide ($Li_4Ti_5O_{12}$) having a spinel structure may be stacked on the surface of the CNT in the form of a nano-sized particle, and may have a large specific surface area.

The method of preparing the complex of lithium titanium oxide ($Li_4Ti_5O_{12}$) having a spinel structure and CNT is the same as described above.

The present invention also relates to an anode material for a lithium secondary battery including the complex of lithium titanium oxide ($Li_4Ti_5O_{12}$) having a spinel structure and CNT according to the present invention.

When the complex of lithium titanium oxide ($Li_4Ti_5O_{12}$) having a spinel structure and CNT is applied to a lithium secondary battery, it may facilitate penetration of an electrolyte and have excellent charge/discharge characteristics. For these reasons, the complex may be used as an anode material for a lithium secondary battery.

The anode material for the lithium secondary battery according to the present invention may have a capacity of 100 mAh/g at 50C-rate and may maintain a value of discharge capacity of 95% or more of initial discharge capacity after 100 cycles of discharging at 1C-rate.

The present invention also relates to a lithium secondary battery including an electrode having the electrode material for a lithium secondary battery according to the present invention.

The structure of the lithium secondary battery according to the present invention is not particularly limited, and may employ a structure generally used in related art without limitation, as long as it includes an electrode having the anode material for a lithium secondary battery according to the present invention.

Hereinafter, the present invention will be described in further detail with reference to examples according to the present invention, but the scope of the present invention is not limited to the following examples.

Example 1

Preparation of Complex of Titanium Oxide ($TiO_2$) and CNT

Figure 1:
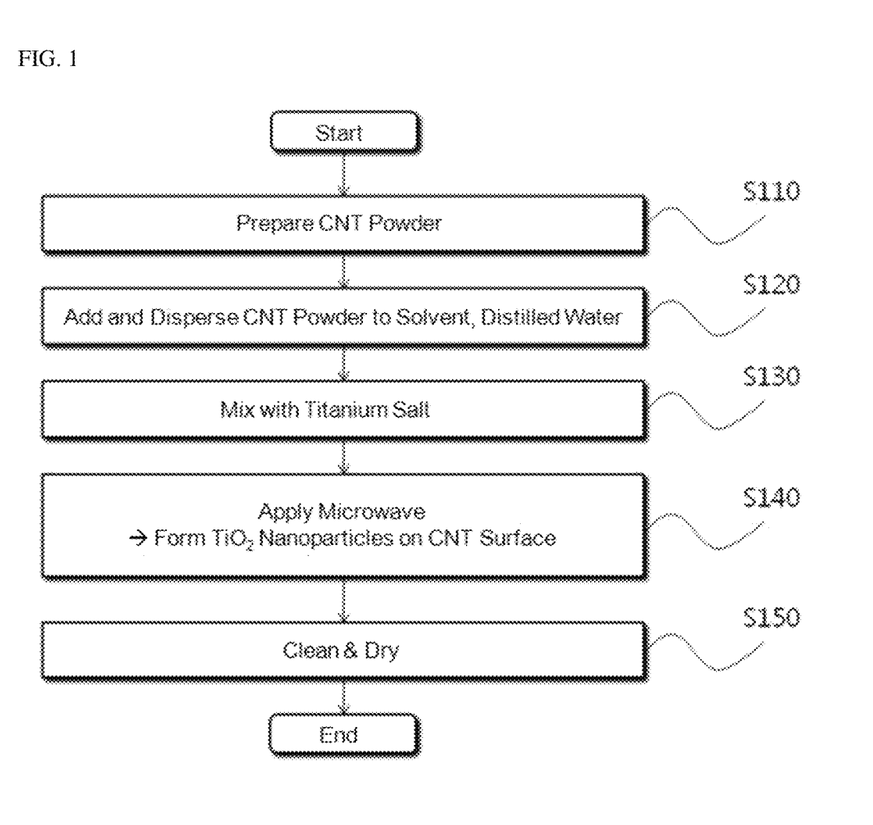
FIG. 1 is a flowchart of a process of preparing a complex of titanium oxide ($TiO_2$) and CNT according to an exemplary embodiment of the present invention.

To prepare a complex of Titanium Oxide ($TiO_2$) and CNT, a preparation process was performed as shown in FIG. 1.

(1) Dispersion of CNT Powder

A CNT powder was prepared and mixed in a solvent, distilled water. Afterward, the CNT powder was uniformly dispersed by treatment of ultrasonic waves.

(2) Preparation of Mixed Solution of Dispersion and Titanium Salt

A dispersion solution in which the CNT was uniformly dispersed and a titanium salt were mixed and stirred, thereby preparing a mixed solution for hydrothermal synthesis. The titanium salt was a tertiary titanium ($Ti^{4+}$) salt, which is called titanium ethoxide. As to be described below, when the microwave is applied, the titanium salt may be easily educed from the solvent, distilled water, and then formed in the form of titanium oxide on the surface of the CNT. When ethylene glycol is used as the dispersion solvent, ethanol may be mixed to educe the titanium salt.

(3) Application of Microwave to Mixed Solution

The prepared mixed solution was put in a microwave-synthesizing device to apply microwave having a frequency of 2.45 GHz to the mixed solution at 200° C. for 10 minutes, thereby preparing a complex of titanium oxide and CNT on the surface of which the titanium oxide was uniformly coated.

(4) Cleaning and Drying of Complex of Titanium Oxide and CNT

To remove the solvent and impurities, which remained in the prepared complex of titanium and CNT, the complex was cleaned several times using ethanol as a cleaning solution and then dried at 70° C.

Example 2

Preparation of Complex of Iron Oxide ($Fe_3O_4$) and CNT

Figure 4:
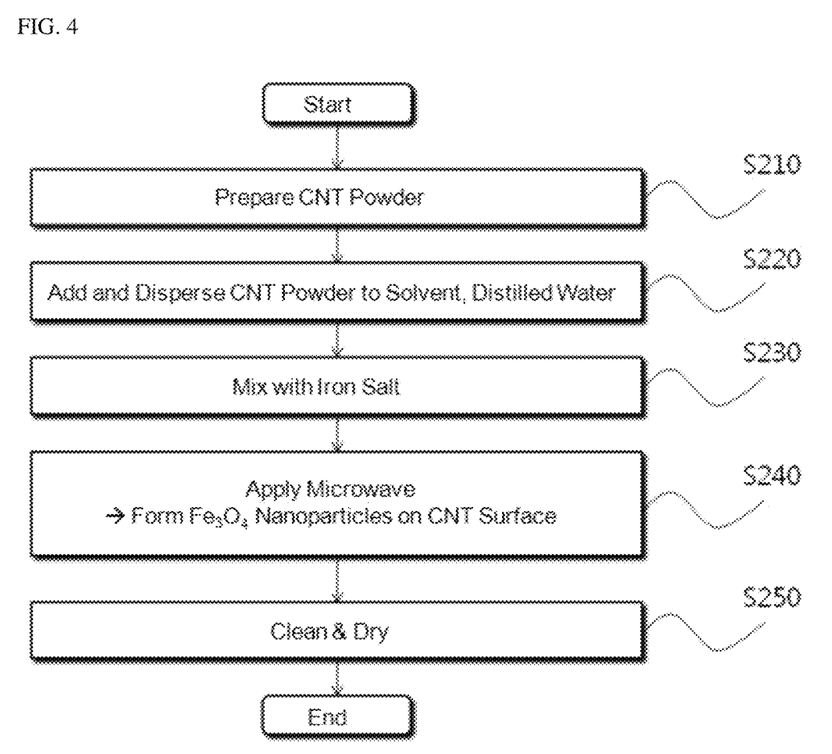
FIG. 4 is a flowchart of a process of preparing a complex of iron oxide ($Fe_3O_4$) and CNT according to another exemplary embodiment of the present invention.

To prepare a complex of iron oxide and CNT, a preparation process was performed as shown in FIG. 4. In detail, the complex of iron oxide and CNT was prepared by the same method as described in Example 1, except that, as a transition metal salt, an iron salt, instead of a titanium salt, was used, and ammonia was further mixed to the dispersion solution to adjust the pH. As the iron salt, a mixture of $FeCl_2$ and $FeCl_3$ was used.

Example 3

Preparation of Complex of Lithium Titanium Oxide ($Li_4Ti_5O_{12}$) Having Spinel Structure and a CNT To prepare a complex of lithium titanium oxide ($Li_4Ti_5O_{12}$) having a spinel structure and CNT, a preparation process was performed as shown in FIG. 4.

(1) Dispersion of Powder of Complex of Titanium Oxide ($TiO_2$) and CNT

The powder of the complex of titanium oxide and CNT prepared in Example 1 was prepared and mixed in a solvent, distilled water. Afterward, the complex powder was uniformly dispersed by treatment of ultrasonic waves.

(2) Preparation of Dispersion Solution and Lithium Salt 0.2M of lithium salt (LiOH) and lithium perchlorate ($LiClO_4$) were mixed and stirred in a dispersion solution of the powder of the complex of titanium oxide and CNT, thereby preparing a mixed solution for hydrothermal synthesis.

(3) Application of Microwave to Mixed Solution

This operation was performed by the same method as described in Example 1. As a result, lithium bound to the titanium oxide on the surface of the complex of titanium oxide and CNT, thereby forming lithium titanium oxide, and the lithium titanium oxide was selectively and uniformly formed in the form of a nanoparticle on the surface of the CNT.

(4) Cleaning and Drying of Complex of Lithium Titanium Oxide and CNT

This operation was performed by the same method as described in Example 1.

(5) Heat Treatment of Complex of Lithium Titanium Oxide and CNT

Heat treatment was performed to the cleaned and dried complex of lithium titanium oxide and CNT in an atmosphere of argon including 5% hydrogen at 700° C. for approximately 5 hours, and the structural change into lithium titanium oxide having a spinel structure occurred without destruction of the nanostructure of the lithium titanium oxide. As a result, a complex of lithium titanium oxide having a spinel structure and CNT was prepared.

Example 4

Preparation of Complex of Ruthenium Oxide ($RuO_2$) and CNT

Figure 11:
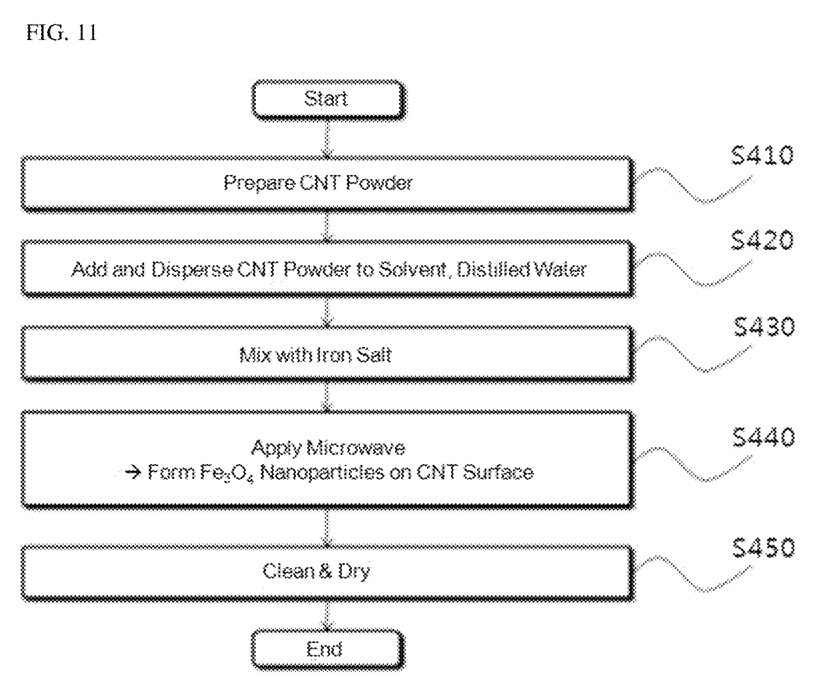
FIG. 11 is a flowchart of a process of preparing a complex of ruthenium oxide ($RuO_2$) and CNT according to yet another exemplary embodiment of the present invention.

To prepare a complex of ruthenium oxide and CNT, a preparation process was performed as shown in FIG. 11. In detail, the complex of ruthenium oxide and CNT was prepared by the same method as described in Example 1, except that, as a transition metal salt, a ruthenium salt instead of a titanium salt was used, and ammonia was further mixed to the dispersion solution to adjust the pH.

Example 5

Preparation of Half-Cell

To analyze electrochemical characteristics of the complex of lithium titanium oxide having a spinel structure and CNT, the complex of lithium titanium oxide having a spinel structure and CNT was used as an anode material to prepare a half-cell.

80 parts by weight of the complex of lithium titanium oxide having a spinel structure and CNT prepared in Example 3, 10 parts by weight of carbon black as a conductor and 10 parts by weight of polyvinylidene fluoride (PVDF) as a binder were mixed, and the mixture was added to N-methyl-3-pyrolidone (NMP), thereby preparing an electrode slurry. Subsequently, 2 mg of the electrode slurry was coated on a titanium current collector and then dried. As a result, an electrode was prepared. Lithium metals were used as a reference electrode and a counter electrode, and 1M lithium perchlorate ($LiClO_4$) dissolved in polycarbonate was used as an electrolyte.

Experimental Example 1

Identification of Complex of Transition Metal Oxide/CNT

To identify the complexes of transition metal oxide and CNT prepared in Examples 1 to 4, analysis of X-ray diffraction (XRD) was performed.

Figure 2:
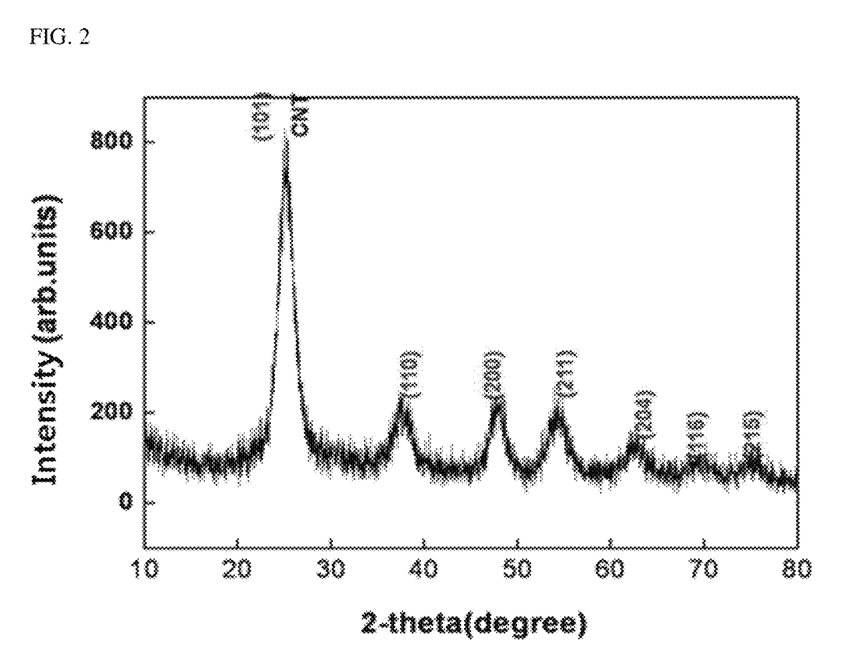
FIG. 2 is a graph of analysis of X-ray diffraction (XRD) which can identify the titanium oxide in the complex of titanium oxide ($TiO_2$) and CNT prepared according to the exemplary embodiment of the present invention.
Figure 5:
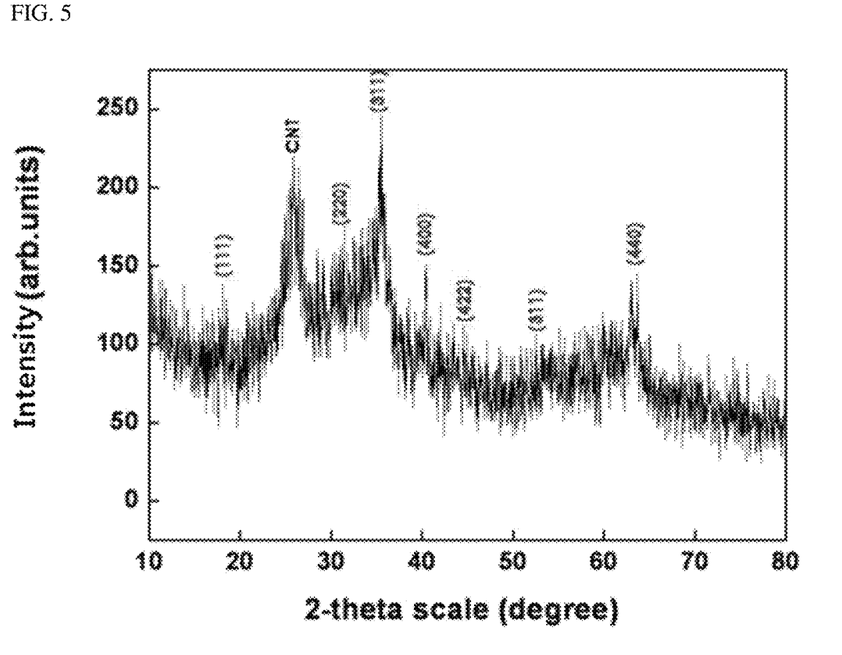
FIG. 5 is a graph of analysis of XRD which can identify the iron oxide in the complex of iron oxide ($Fe_3O_4$) and CNT prepared according to another exemplary embodiment of the present invention.
Figure 8:
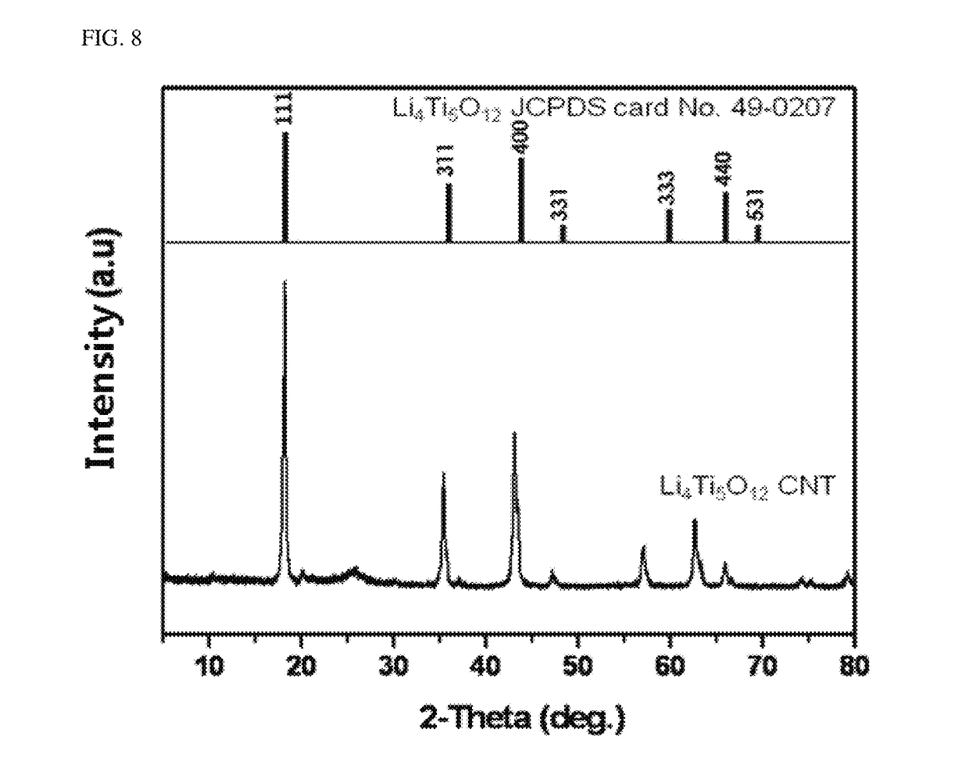
FIG. 8 is a graph of analysis of XRD which can identify the lithium titanium oxide in the complex of lithium titanium oxide ($Li_4Ti_5O_{12}$) having a spinel structure and CNT prepared according to still another exemplary embodiment of the present invention.

FIGS. 2, 5 and 8 are, respectively, graphs showing results for analyses of XRD with respect to the complex of titanium oxide and CNT, the complex of iron oxide and CNT, and the complex of lithium titanium oxide having a spinel structure and CNT. As shown in FIGS. 2, 5 and 8, it is confirmed that the complex of titanium oxide and CNT, the complex of iron oxide and CNT, and the complex of lithium titanium oxide having a spinel structure and CNT were prepared according to the methods of preparing transition metal oxide and CNT of the present invention.

In addition, to identify the complexes of transition metal oxide and CNT prepared in Examples 3 and 4, Raman analysis was performed.

Figure 9:
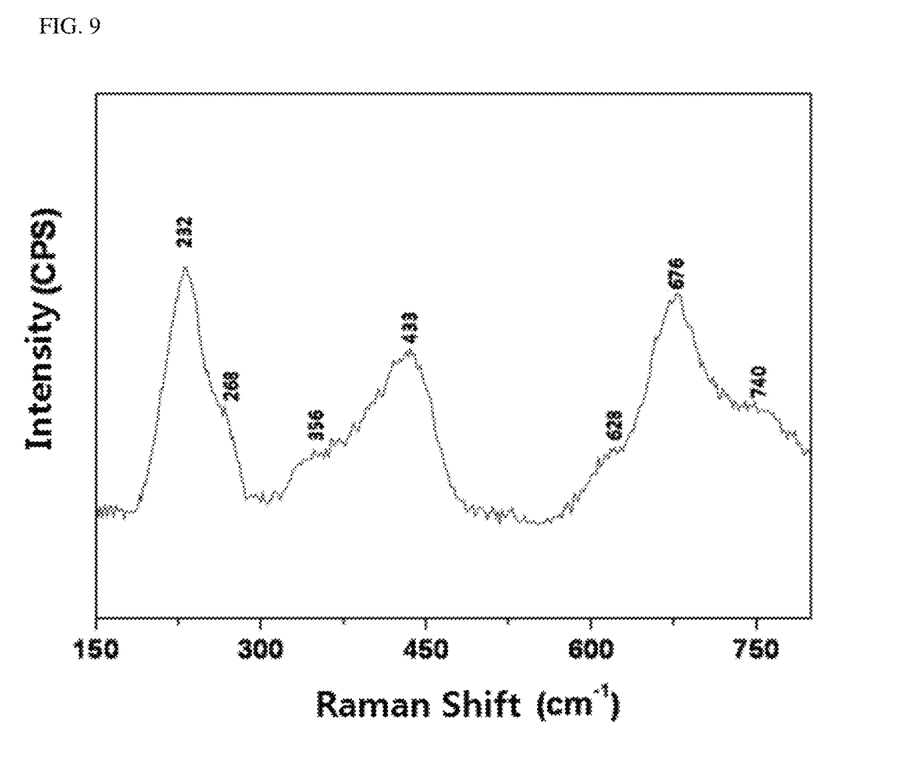
FIG. 9 is a graph showing results of Raman analysis which can identify the lithium titanium oxide in the complex of lithium titanium oxide ($Li_4Ti_5O_{12}$) having a spinel structure and CNT prepared according to still another exemplary embodiment of the present invention.

FIG. 9 shows Raman data for the complex of lithium titanium oxide having a spinel structure and CNT, and therefrom, it was confirmed that the lithium titanium oxide having a spinel structure was formed on the surface of the CNT by the preparation method of the present invention.

Figure 13:
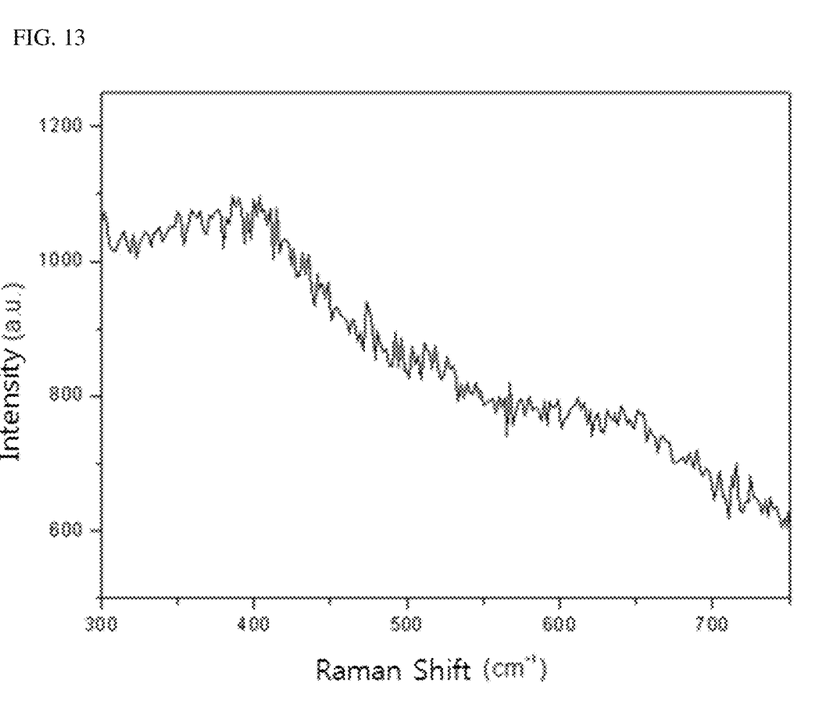
FIG. 13 is a graph showing results of Raman analysis which can identify the ruthenium oxide in the complex of ruthenium oxide ($RuO_2$) and CNT prepared according to yet another exemplary embodiment of the present invention.

FIG. 13 shows Raman data for the complex of ruthenium oxide and CNT, and therefrom, it was confirmed that ruthenium oxide was formed on the surface of the CNT by the preparation method of the present invention.

Experimental Example 2

Identification of Complex of Transition Metal Oxide and CNT

To check types of the complexes of transition metal oxide and CNT prepared in Examples 1 to 4, the complexes were observed by FETEM.

Figure 3:
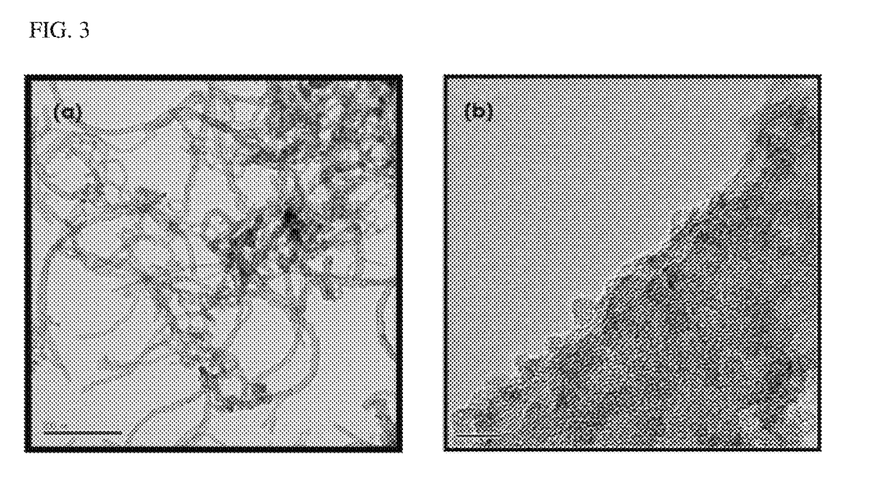
FIG. 3 is field emission transmission electron microscopy (FETEM) images of the complex of titanium oxide ($TiO_2$) and CNT prepared according to the exemplary embodiment of the present invention.

FIG. 3 is FETEM images of the complex of titanium oxide and CNT, and (b) is an enlarged image of (a). As shown in FIG. 3, it can be seen that the titanium oxide was uniformly formed on the surface of the CNT in the form of a nanoparticle, and the shape of the particle was spherical (particle diameter: 2 to 10 nm).

Figure 6:
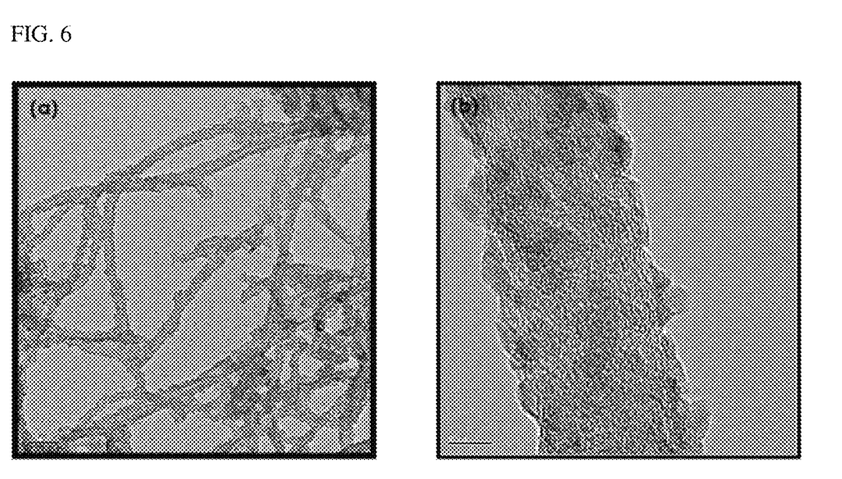
FIG. 6 is FETEM images of the complex of iron oxide ($Fe_3O_4$) and CNT prepared according to another exemplary embodiment of the present invention.
Figure 7:
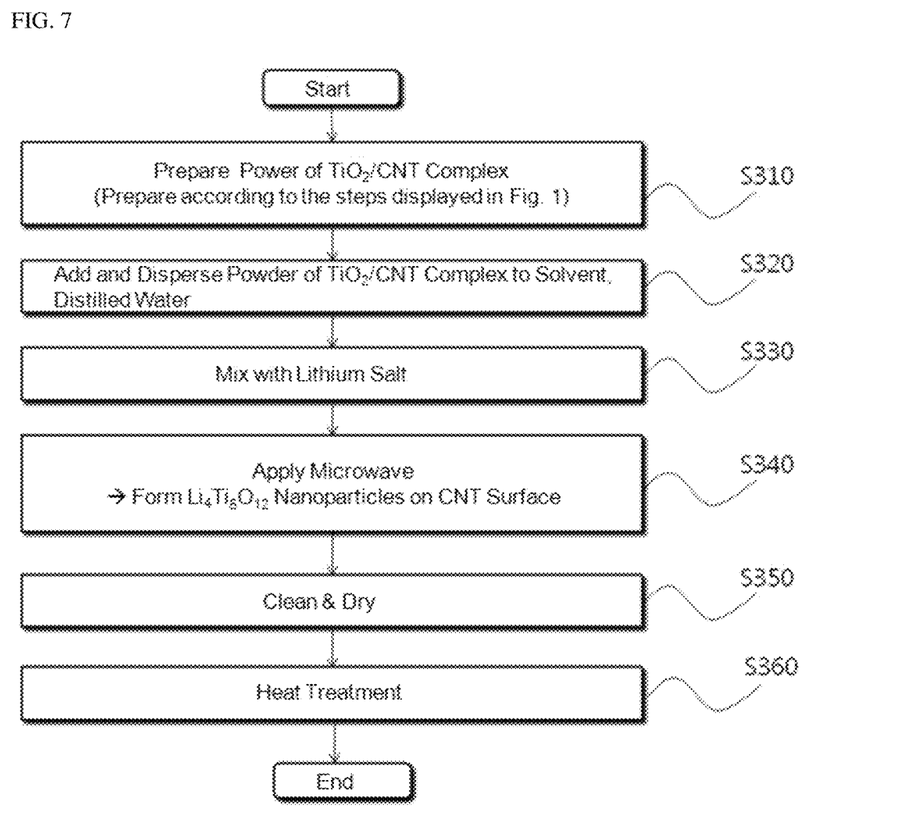
FIG. 7 is a flowchart of a process of preparing a complex of lithium titanium oxide ($Li_4Ti_5O_{12}$) having a spinel structure and CNT according to still another exemplary embodiment of the present invention.

FIG. 6 is FETEM images of the complex of iron oxide and CNT, and (b) is an enlarged image of (a). As shown in FIG. 6, it can be seen that the iron oxide was formed on the surface of the CNT in the form of a nanoparticle, and the shape of the particle was spherical (particle diameter: 2 to 10 nm).

Figure 10:
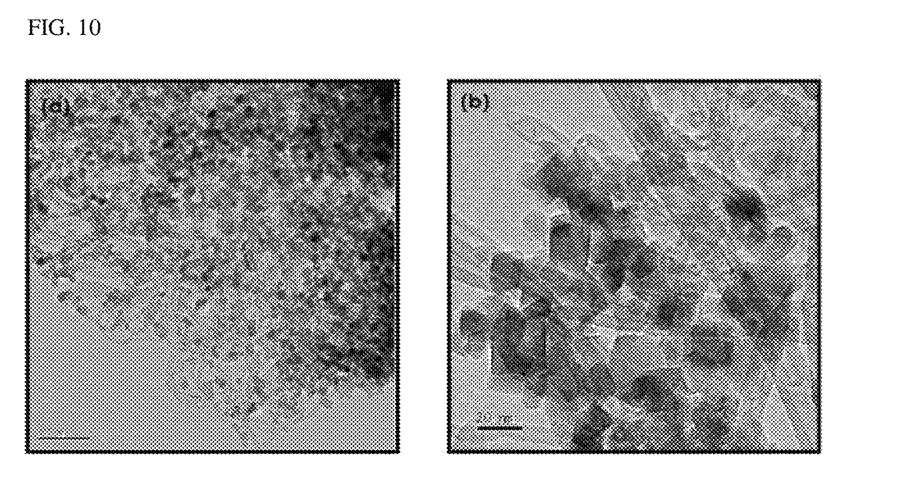
FIG. 10 is FETEM images of the complex of lithium titanium oxide ($Li_4Ti_5O_{12}$) having a spinel structure and CNT prepared according to still another exemplary embodiment of the present invention.

FIG. 10 is FETEM images of lithium titanium oxide having a spinel structure and CNT, and (b) is an enlarged image of (a). As shown in FIG. 10, it can be seen that the lithium titanium oxide having a spinel structure was uniformly formed on the surface of the CNT in the form of a nanoparticle, and the shape of the particle was spherical (particle diameter: 5 to 30 nm).

Figure 12:
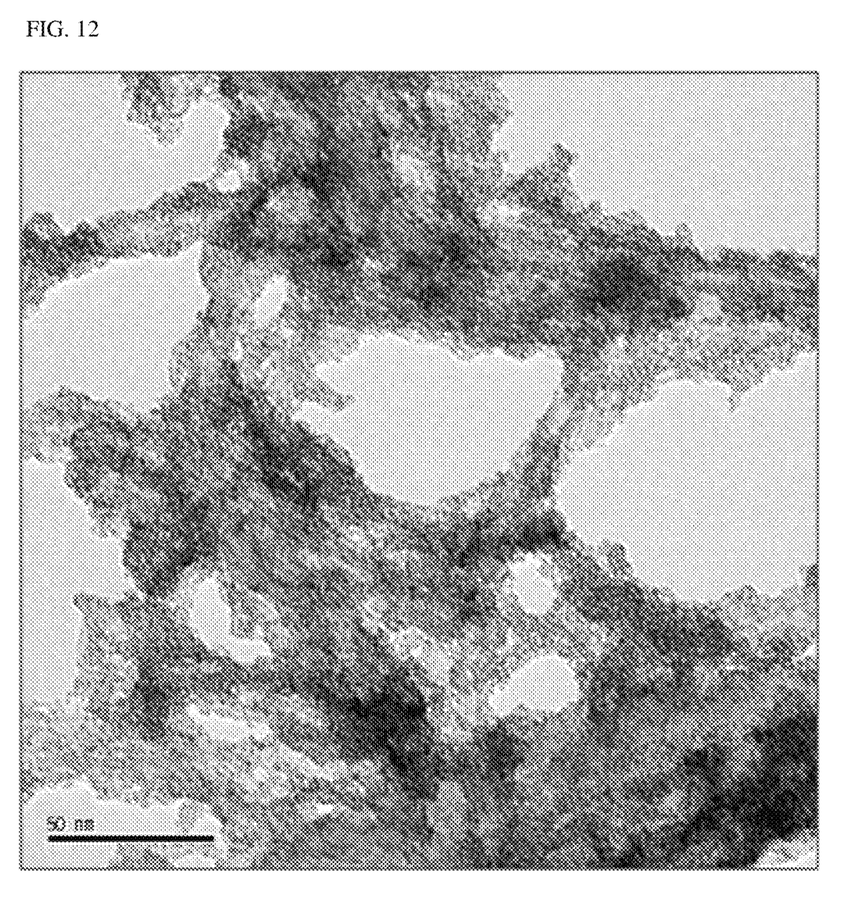
FIG. 12 is an FETEM image of the complex of ruthenium oxide ($RuO_2$) and CNT prepared according to yet another exemplary embodiment of the present invention.

FIG. 12 is an FETEM image of the complex of ruthenium oxide and CNT. As shown in FIG. 12, it can be seen that ruthenium oxide was uniformly formed on the surface of the CNT in the form of a nanoparticle, and the shape of the particle was spherical (particle diameter: 2 to 10 nm).

Experimental Example 3

Evaluation of Electrochemical Characteristics of Half-Cell

In the half-cell prepared in Example 5, charge and discharge capacity characteristics of an electrode including the complex of lithium titanium oxide having a spinel structure and CNT were evaluated. The voltage range was adjusted to 1 to 3 V, and the charge/discharge rate was changed from 1C-rate (1 hour) to 50C-rate (72 seconds).

Figure 14:
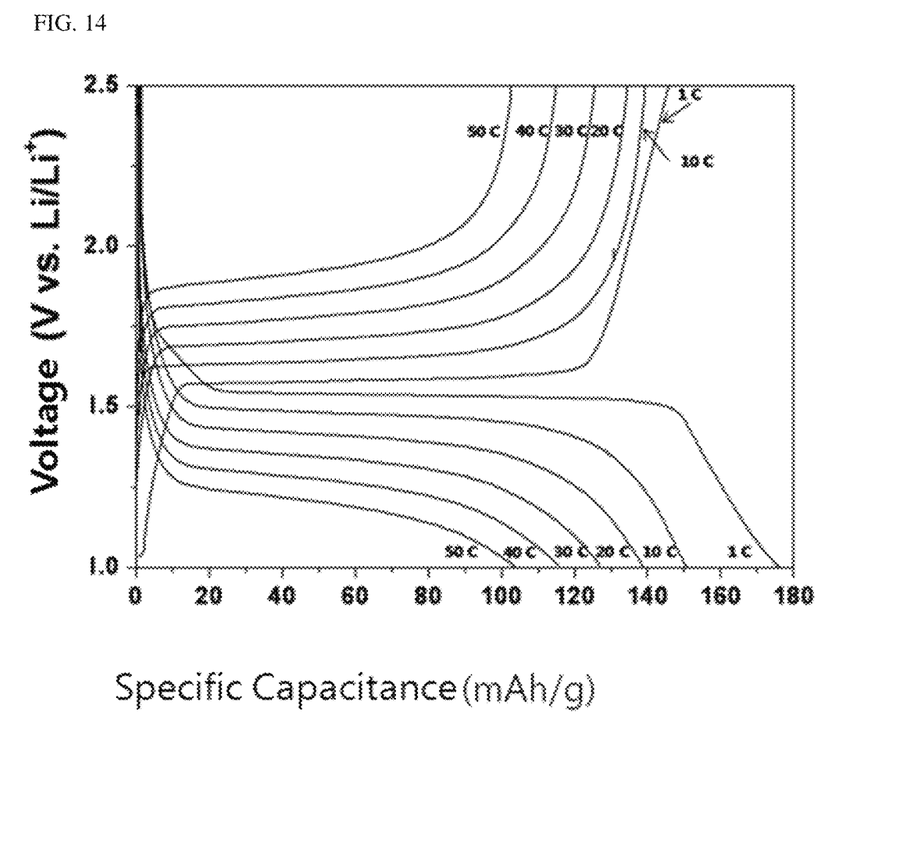
FIG. 14 is a graph of a capacity of an active material per unit weight of an electrode, which is obtained through evaluation of charge and discharge capacity characteristics.

FIG. 14 is a graph showing capacity of an active material per unit weight of an electrode obtained through evaluation of the charge and discharge capacity characteristics. As shown in FIG. 14, it was confirmed that due to the complex of lithium titanium oxide having a spinel structure and CNT prepared according to the present invention, the charge and discharge capacity characteristics were enhanced, compared with the capacity value reported in prior art. That is, the active material expressed a theoretical capacity (175 mAh/g) at 1C-rate, and particularly, had a capacity of approximately 100 mAh/g or more, i.e., approximately 104 mAh/g even at 50C-rate, which is a very large value, compared with the lithium secondary battery reported in prior art. It shows that when a lithium secondary battery was prepared using the complex of lithium titanium oxide having a spinel structure and CNT as an anode material, compared with the conventional art, charge/discharge characteristics can be significantly improved. It seems that such improvement of the charge/discharge characteristics (capacity and rate capability) was caused by the increase in specific surface area due to the transition metal oxide formed on the surface of the CNT in the form of a nanoparticle in the complex prepared according to the present invention, and enhancing conductivity due to the CNT.

Figure 15:
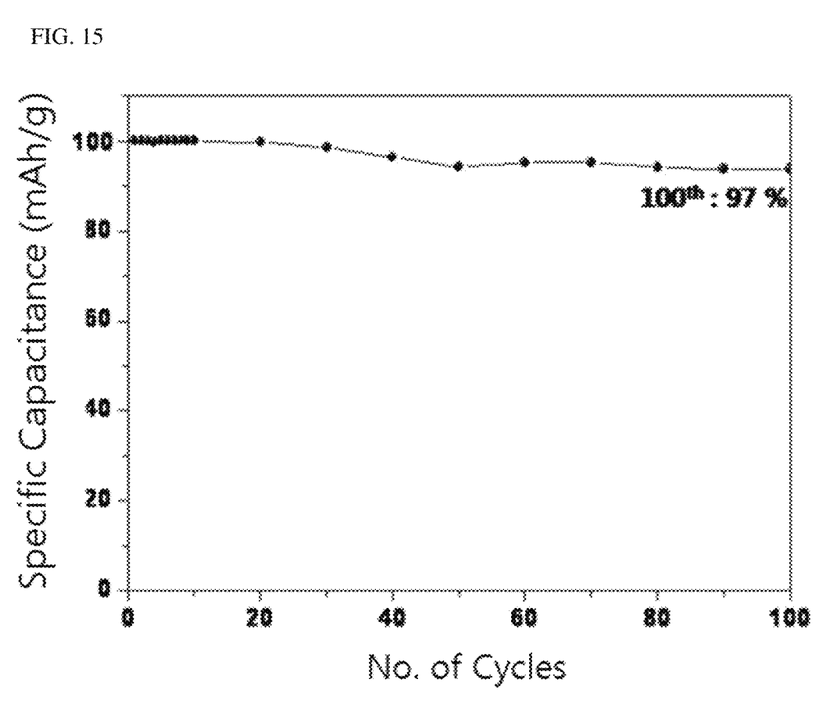
FIG. 15 is a graph of a lifespan characteristic of the complex of lithium titanium oxide ($Li_4Ti_5O_{12}$) having a spinel structure and CNT prepared according to an exemplary embodiment of the present invention.

FIG. 15 is a graph showing a lifespan characteristic of the complex of lithium titanium oxide having a spinel structure and CNT prepared according to the preparation method of the present invention. As shown in FIG. 15, based on 1C-rate, it can be seen that a discharge capacity value is approximately 95% or more, that is, approximately 97% of an initial discharge capacity after 100 cycles, and based on 10C-rate, a discharge capacity value is approximately 95% or more, that is, approximately 98% of an initial discharge capacity after 100 cycles.

According to a preparation method of the present invention, a complex of transition metal oxide and CNT can be synthesized for a short time, for example, 10 to 30 minutes, and the transition metal oxide in the complex of transition metal oxide and CNT prepared by the preparation method of the present invention is stacked on the surface of the CNT in the form of a nanoparticle, and thus charge/discharge characteristics of the lithium secondary battery can be improved.

While the invention has been shown and described with reference to certain exemplary embodiments thereof, it will be understood by those skilled in the art that various changes in form and details may be made therein without departing from the scope of the invention as defined by the appended claims.

What is claimed is:

1. A method of preparing a complex of lithium titanium oxide having a spinel structure and carbon nanotube, comprising:
   (a) a step in preparing dispersion by dispersing a powder of the complex of titanium oxide and carbon nanotube in distilled water by treatment with ultrasonic waves;
   (b) a step in preparing the mixed solution by mixing the dispersion with an lithium salt; and
   (c) a step in synthesizing the complex of lithium titanium oxide and carbon nanotube by applying a microwave to the mixed solution, wherein the titanium oxide is formed on the surface of the carbon nanotube,
   (d) a step in heat-treating the complex of lithium titanium oxide and carbon nanotube in an argon atmosphere including hydrogen at 500 to 900° C., and
   (e) a step in cleaning and drying the complex of lithium titanium oxide and carbon nanotube,
   wherein, in operation (c), the application of the microwave is performed at boiling point or at a higher temperature of the mixed solution.

2. The method according to claim 1, wherein, in operation (b), a pH adjuster is further mixed.

3. The method according to claim 2, wherein the pH adjuster is at least one selected from the group consisting of ammonia, distilled water, urea, sodium hydroxide and potassium hydroxide.

4. The method according to claim 1, wherein, in operation (c), the microwave is applied for 10 to 30 minutes.

5. The method according to claim 1, wherein, in operation (c), the titanium oxide formed on a surface of the carbon nanotube has a particle size of 2 to 30 nm.

* * * * *